Jan. 26, 1960 P. LUDY ET AL 2,922,195
FLEXIBLE WEAR-RESISTANT COATINGS
Filed Sept. 8, 1954

INVENTORS
PAUL LUDY
HAROLD R. BENNETT AND
ROBERT W. MOORMAN
Oscar L. Spencer
ATTORNEY

United States Patent Office 2,922,195
Patented Jan. 26, 1960

2,922,195

FLEXIBLE WEAR-RESISTANT COATINGS

Paul Ludy, Farmerville, Harold R. Bennett, Dayton, and Robert W. Moorman, New Carlisle, Ohio, assignors to Pittsburgh Plate Glass Company Application September 8, 1954, Serial No. 454,810

5 Claims. (Cl. 18—60)

This invention relates to coatings for rubber articles and it has particular relation to coatings which simultaneously are permanently coherent to rubber articles and are highly wear resistant and are also receptive to durable color pigmentation.

It is to be recognized that cured rubber stocks, such as are employed in floor mats and in many other applications, are normally of a dull, unattractive color. To overcome this defect by incorporation of attractively colored pigments into the body of the rubber stock, is not practicable because of cost and because of the danger of objectionably changing the curing characteristics or the wearing properties of the rubber.

It might seem reasonable to obviate these defects by coating a preformed rubber article with a liquid medium, such as a paint, having an appropriate pigmentation to give a desired color. However, such course involves many problems and difficulties. For example, the coating should be bonded firmly to the rubber base. This usually means that the film must wet the surface and intimately permeate the pores thereof. The films must also be able to follow flexures, shrinkages and expansions of the rubber base without cracking or becoming loosened. The material comprising the vehicle in the film should also be receptive to pigments and fillers so that the latter will not segregate or stratify and when cured, it should be resistant to scuffing and wear for a substantial period.

Needless to say, the material comprising the films should also be relatively inexpensive and should be easy to apply preferably as a liquid or paste which is subsequently cured to obtain a bond to the rubber base and to obtain mar resistance.

This problem is accentuated in articles having regosely textured surfaces, for example in floor mats for automobiles or bath mats, which usually involve sheets of rubber of substantial thickness, e.g. $\frac{1}{16}$ inch or more, and have pebbled, corded, reticulated, or other rugose designs indented into the body or base of rubber in order to give an attractive appearance, perhaps simulating carpeting and also reducing the slipperiness of the surface. It is quite difficult to provide coatings on such surfaces which will concurrently follow the protuberances and the depressions of the surface with reasonable continuity and uniformity of thickness and which will also firmly bond to the rubber base to provide a wear resistant coating.

Heretofore, manufacturers have been forced to rely upon coatings of pigmented rubber solutions for this purpose. Such films when initially applied were reasonably attractive and likewise were comparatively inexpensive, but they had only slight resistance to wear and therefore they provided mere temporary decorations while the articles were new and unused, or but slightly used.

It has now been found that an excellent and inexpensive film can be formed upon a surface of a rubber article, even on an article having a highly rugose surface, by coating a surface, such as one of a stock of a vulcanizable rubber or rubber-like material constituting a base with an aqueous dispersion or latex of (1) a vulcanizable natural, or synthetic rubber, such as an interpolymer of a diene and a monomer containing a $>C=CH_2$ group and (2) a hard, tough, wear resistant polymer of a $>C=CH_2$ monomer and then molding and curing the article with the coated surface in contact with a mold surface having the desired pattern. As a result of the heating operation, the rubber stock in the base is vulcanized, and the sulfur of the base also tends to migrate under the action of heat into the surface film, thus vulcanizing the latex component of the latter. Likewise, the vinyl component is cured to a hard, wear resistant, insoluble state.

Surprisingly, it is found that the surface films of dispersion are laid down in relatively uniform thickness on the rubber base and continuity of the film is retained during the flowage of the hot rubber to fill out the mold designs. Of course, as the surface of the rubber base is extended in conformance to the mold design, the thickness of the film is reduced proportionally. However, there is but little tendency of the film to become of irregular thickness due to flowage of the material to localized spots at the expense of that in contiguous areas. This, within itself is a most surprising result. However, this is by no means all since the film adheres quite tenaciously to the rubber base, presumably by reason of a tendency of the rubber-vinyl polymer mixture to flow into the pores and other surface irregularities thereof in order to key the two surfaces together. Furthermore, the vinyl component in the film in spite of the presence of the rubber of the film, in large measure exerts a hardening effect, thus reducing the rate of wear and scuffing of the latter to a very substantial extent. The surface films, although they are quite wear resistant, are still capable of flexing with the bending of the rubber base and likewise they follow all the contractions and expansions of the rubber during the curing operation and during subsequent use with but little or no tendency to crack or craze.

For a better understanding of the invention, reference may now be had to the accompanying drawings in which.

Figure 1:
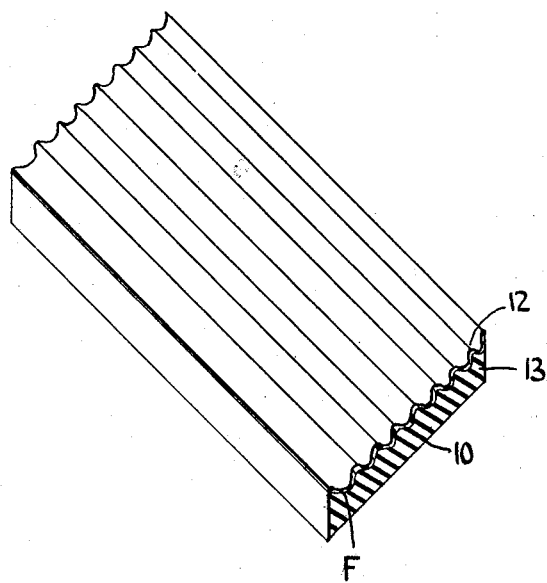
Fig. 1 is a fragmentary portion of an article, such as a floor mat, having a rugose surface and being coated with materials such as disclosed in the present invention.

The construction, as shown in the drawings, comprises a base layer 10 which preferably is of an elastomeric material, such as a vulcanized rubber reclaim, which because of its inexpensive nature, is preferred in the manufacture of such articles as floor mats for automobiles, bath mats and other articles of like nature. Virgin rubber, natural or synthetic, could be employed, if so desired, but is more expensive. The base layer usually will be of substantial thickness, for a mat being about $\frac{1}{16}$ to about $\frac{1}{4}$ of an inch, though somewhat greater or lesser thickness may be employed, if so desired. As illustrated in the drawings, the surface is provided with rugosities forming a texture 12 which run approximately parallel to each other and which simulate the effects of carpeting.

Other rugose designs, such as pebbled effects, or reticulated designs may be employed in the surface under consideration. The designs are indented into the body of the rubber base as contrasted with merely corrugating a sheet of rubber in such manner that the designs are repeated in reverse upon opposite sides thereof. The surfaces of the rugosities are covered with a substantially uniform layer on film F of a tough, wear resistant mixture comprising as its main film forming ingredients rubber (usually synthetic) in quite uniform, relatively homogeneous mixture with, one or more polymers of vinyl compounds containing $>C=CH_2$ groups attached to negative radicals and being designed to impart, hardness, toughness and wear resistance to the film or layer. The layer, or film should also contain pigments in a color and in such amount as properly to color the surface.

Such films are most readily obtained in relatively uniform thicknesses and with excellent adhesion, even on highly rugose surfaces by mixing the several components as an aqueous latex similar to a so-called rubber base paint, applying the latex to a plain body or sheet S of solid, compounded, but uncured, rubber stock and then concurrently molding and curing the assembly with the film in contact with an appropriately configured mold surface. This method will subsequently be more fully elaborated upon.

A substantial thickness 13 of the rubber base sheet is disposed below the rugosities and renders the sheet relatively nonextensible in transverse direction, except possibly by stretching the rubber. It will be recognized that the lower face of the sheet may also be reinforced by a sheet of fabric, burlap or the like if desired, though such reinforcement is not presently illustrated in the drawing and is optional.

Figure 2:
Fig. 2 is a fragmentary section of a sheet of stock to be coated.
Figure 3:
Fig. 3 is a fragmentary section of the stock after it has been coated and before it is molded and cured.

In the manufacture of a coated sheet, such as a floor mat for an automobile, or a bath mat, or other sheet rubber article, in accordance with the provisions of the present invention, sheet S of compounded rubber stock, such as a rubber mat stock, indicated fragmentarily in Fig. 2, may be prepared in any convenient manner. Assuming that the stock is a rubber mat stock, it will usually be composed largely of an inexpensive material, such as reclaimed natural or synthetic rubber. As will be recognized, such reclaimed rubber is obtained by appropriately processing used rubber, such as worn out tire carcasses or other used rubber articles too numerous to mention. The rubber may be reclaimed by one of a plurality of methods, such as treatment with strong alkali; or by the so-called "neutral process" which involves digestion of the used rubber with a metallic chloride. Often reclaim rubber may contain so-called "reclaiming oils," such as coal tar. Many such oils are listed in the book "Compounding Ingredients for Rubber" published by India Rubber World, second edition, pages 440 to 445.

The sheet S may include additions of virgin rubber, either natural or synthetic, if higher quality is desirable. Naturally, the stock may also contain natural or synthetic rubber in unused state to the exclusion of reclaim, though this tends substantially to increase the cost of the mat. The sheet further includes compounding ingredients, such as sulfur, which in a reclaimed stock will be added in an amount of about 2 to 4 percent by weight based upon the total mixture. Needless to say, some sulfur is also present as residual sulfur from the original vulcanization. Small amounts of organic accelerators, such as mercaptobenzothiazol, diphenylguanadine, thiocarbanilide, zinc dibutyl dithiocarbamate or any other appropriate accelerator of vulcanization may be employed. Activators (inorganic or organic), such as zinc oxide, stearic acid or other fatty acids may be included. Reinforcing agents, such as carbon black, and fillers, such as calcium carbonate, may be included if desired. The compounding of the stock is not a feature of the present invention since a commercial stock may be employed without substantial modification in the practice of the present invention. The following constitutes a typical simplified formulation of a reclaim stock:

| | |
|---|---|
| Reclaim | $^1$R |
| Stearic acid parts | 2 |
| Zinc oxide do | 5 |
| Mercaptobenzothiazole do | 0.5 |
| Diphenylguanidine do | 0.2 |
| Sulfur do | 3.0 |

$^1$ R = the amount of reclaim containing 100 parts of rubber (parts as above given are by weight). Obviously substitutions and additions can be made in this formulation as may be deemed expedient or desirable.

In forming a coated mat or similar article in accordance with the provisions of the present invention, the unvulcanized, unmolded sheet of stock S, as illustrated in Fig. 2, is further coated with a film or layer F of an aqueous emulsion or dispersion comprising as its main solids components a rubber latex and one or more hardening and toughening components. Preferably these are polymers or copolymers of vinyl or other compounds containing $>C=CH_2$ group attached to a negative radical.

The total of the vinyl components will usually be employed in a range of about 20 to 50 percent by weight based upon the total mixture of rubber solids and vinyl solids in the film. Rubber latices may be natural ammonia preserved latices, but preferably are synthetic materials, such as an emulsion of a copolymer of butadiene and styrene, or polyvinyl acetate. Many dispersions of rubber, natural and synthetic are commercially available in large volumes. Some of these are listed on pages 593 through 612 of the herein mentioned book, "Compounding Ingredients for Rubber." Selections of rubber latex can readily be made from this source.

A part of, or all of the toughening and hardening vinyl component may be finely pulverulent material, the finer and more impalpable, the better. Usually it should pass a screen of at least about 100 mesh. One such pulverulent resin is a vinyl chloride-vinyl acetate interpolymer sold under the trade name of Vinylite VYNS. Such interpolymers comprise about 68 to 95 percent by weight of vinyl chloride, the remainder being vinyl acetate.

It is also desirable (though not indispensibly so) that some of the hardening and toughening resin be present in the form of an aqueous latex or emulsion, such as an emulsified polystyrene. This cures rapidly and imparts hardness to the film. Latices of other syntheic resins from which selections can be made in compounding the coating films of this invention are included in the foregoing book, "Compounding Ingredients for Rubber," page 613. Polystyrene emulsions, containing about 50 percent solids, are preferred.

The film, as previously indicated, is applied as an aqueous emulsion. Often the preparation and use of such emulsion requires the use of added minor ingredients, most of, or all of which can be selected from those listed in the book "Compounding Ingredients for Rubber" in the pages hereinafter designated. They include wetting agents (see pages 477 to 484) represented by ammonium salts of higher fatty acids, such as stearic acid, oleic acid, or the like; latex stabilizing agents (see pages 468 to 474) such as casein designed to maintain the emulsion; bactericides or antiseptics (see pages 407 to 408) such as a water-soluble salt of a phenol; and thickening agents (see pages 475 to 476), designed to maintain the thixotropic nature of material (carboxymethylcellulose is presently preferred). Anti-foaming agents, such as are listed in the foregoing reference, page 445, may be included, as may plasticizers for the resinous components, such as tributoxyethyl phosphate or other plasticizers, in order to increase the flexibility and extensibility of the film (many of these are listed on pages 496 and 497 of the foregoing reference). Still other modifiers comprise mold release agents, such as butylphthalylbutylglycolate. Powders of soapstone or graphite, or soaps, such as aluminum stearate, may also be employed. Many such release agents are described in the foregoing reference book, pages 397 through 404.

These aids are used only in minor amounts and usually they are not essential components of the final, cured film.

Since the film is to be employed primarily as a decorative element, it should also include appropriate coloring materials, such as pigments, which naturally will vary, dependent upon the coloration desired in the coating film. They should not unduly lower the pH value of the latex and should be reasonably resistant to heat.

The coating composition should be of appropriate solids content to attain desired viscosity for application. A solids content of about 25 to 70 percent is suggested with the presently preferred concentration of solids being about 50 percent. The film may vary in thickness dependent upon the degree of wear resistance and other properties desired in the finished article. A minimum thickness of about 3 mils for the finished film is desirable, though this thickness may be increased or somewhat reduced as may be desired. Assuming a concentration of solids of 50 percent, the initial wet film should be of a thickness of about 6 mils. The film may be applied by any convenient technique, such as by spraying, roller coating, flowing, dipping, brushing, or the like.

The volatile constituents, such as water, are evaporated off from the aqueous dispersion constituting the film F in Fig. 2. Evaporation may be forced, if desired, for example by a stream of warm air or by infrared heat, or by any other appropriate means. Evaporation may also be permitted to take place naturally until the surface of the film has become sufficiently dried. The coated surface when dry, or the mold, may be treated with added mold release agent, such as a water solution of a Carbowax (polyethylene glycol) of a solids content of about 5 percent by weight.

Figure 4:
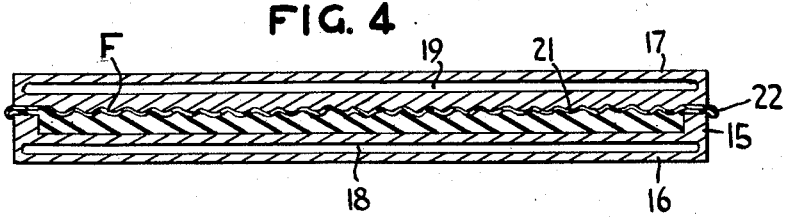
Fig. 4 is a section of a mold containing an article in process of being cured.

The sheet in the uncured state and with the film thereupon may be disposed in any suitable mold, such as the one indicated diagrammatically at 15 in Fig. 4. This mold, as shown, comprises bottom section 16 and top section 17 which respectively have cavities 18 and 19 for the circulation of a heating medium, such as steam, or any other suitable fluid designed to cure the sheet. The surface of one or both of the mold sections may be suitably engraved or configured as indicated at 21 in order to impart a desired design or texture to the surface of the article being formed.

It is usually unnecessary to include sulfur in the latex film since it is found in actual practice that the surfur of the stock or base layer S tends to migrate into the surface film and such migration is sufficient adequately to cure the synthetic latex components. However, if desired, additional sulfur could be incorporated for purposes of promoting the cure.

The heating operation is continued for a sufficient length of time and at a temperature to effect an adequate cure of the rubber, which factors obviously are variable depending mutually upon each other and upon the characteristics of the stock employed. Naturally, the higher the temperature, the shorter the curing time required. In most instances, however, an adequate cure can be attained within a period of about 4 to 10 minutes at a temperature of about 306° F.

In the molding operation, the mold sections 16 and 17 are suitably pressed together in order to assure that the rubber base and the film are firmly pressed against the surfaces so that the details of the mold will be adequately filled out and duplicated in the stock. Usually it is desirable to employ a slight excess of stock which may flow from between the mold surfaces at the edges in a flashing as indicated at 22. This may be subsequently sheared off.

After the stock is adequately cured, the mold sections may be separated and the finished article, such as a mat, is easily stripped out. All details of the mold will be adequately duplicated and the surface film now in a cured state and consisting essentially of rubber admixed with the hardening agent such as polymerized vinyl resin of appropriate type, will be found firmly adherent to the surface of the rubber base and will follow faithfully the surface contours of the rugose surface. This is within itself a surprising result since it is found that this is true even though the surface of the base is indented and textured.

Application of the principles of the invention is illustrated by the following example:

*Example 1*

A rubber sheet S was made up from a reclaim stock of the type known as mat stock and comprised reclaimed rubber, sulfur and other well known compounding ingredients.

This sheet was coated by spray application with an emulsion composition comprising as the essential film forming ingredients a synthetic latex sold under the trade name of Latex 762W by the Dow Chemical Company. This is understood to comprise a butadiene-styrene interpolymer latex of 48 percent solids content. This component is designed to constitute a film former and also gives a firm bond when cured upon the rubber backing. The emulsion also included a finely powdered vinylite resin sold under the trade name of VYNS which was of about 90 percent vinyl chloride and 10 percent vinyl acetate. The material apparently is an interpolymer of the foregoing ingredients. The film forming composition further included an emulsion of polystyrene sold under the trade name of BKS-177 by the Bakelite Corporation.

The proportions of the film forming ingredients were respectively:

Synthetic latex (48 percent solids) parts by weight__ 179
Vinyl resin powder_____do____ 41
Polystyrene emulsion (of solids content)_____57
Pigments to desired color_____pounds__ 161
Water _____do____ 520

The formation of a stable, tractible emulsion may be aided by addition of small amounts of wetting agents, such as ammonium soaps of acids of a glyceride oil; stabilizers, such as casein, to give permanence to the emulsion; thickening or thixotropic agents, such as carboxymethyl cellulose; and mold freeing agents, such as butylphthalylbutylglycolate.

For purposes of imparting plasticity to the surface film and adapting it more completely and readily to follow the shrinkages and contractions of the rubber base, a plasticizer, such as tributyloxyethyl phosphate, may be added.

The pigmentary materials were such as are required to impart the desired color to the film. In this instance the color was a light brown. The specific materials employed to attain this color were calcium carbonate, hydrated clay, titanium dioxide, iron oxide and lamp black as a 50 percent suspension in water known as Aquablak M. The proportions were such as to obtain desired color.

In mixing the several ingredients, a pebble mill was employed, though obviously any other convenient commerical mixer could be employed for the purpose. The mill was initially charged with water, a solution of ammonium soaps of fatty acids (wetting agent), the pigments and 57 pounds of the Latex 762W, and the Vinylite VYNS powder. The mill was then run until these were mixed. The rest of the Latex 762W, the polystyrene (BKS-177) etc. were added and the mill was run to form a stable emulsion. Finally such plasticizers and mold release compounds as seemed to be required were added and the whole was mixed.

This emulsion, as previously indicated, was applied as a coating to rubber base S in accordance with the provisions of the present invention. The emulsion was flash dried on the sheet and was coated with an aqueous mold release agent, namely, a water solution of a polyethylene glycol. The coated sheet was placed in a mold having an appropriately textured surface, as indicated in the drawings, and cured at a temperature of 306° F. for a period of 6 to 9 minutes. The mold was then opened and the resultant mat was readily pulled out. The film was thoroughly adherent to the base and both the rubber base and the film were well cured. Apparently the sulfur in the base had migrated into the film to cure the latex contained in the latter. The vinyl resins from compounds containing >C=CH$_2$ groups were thoroughly cohered and cured to impart a high degree of toughness and abrasion resistance to the film.

*Example II*

In this example, the vinyl chloride-vinyl acetate interpolymer of Example I was replaced by an emulsion of acrylic ester resin, for example one of the so-called Rhoplexes. Many of these are available and are discussed at some length in "Organic Coating Technology" volume I, by Lee Fleming Payne, copyrighted 1954 by John Wiley and Sons, Inc., Library of Congress Catalogue Card No. 54-5971, pages 553-560. So-called Rhoplex A.C. 33 which is an acrylic resin emulsion suitable for water paints described on pages 559-560 is well adapted for the purpose. The several components of the coating composition were as follows:

| | |
|---|---|
| Butadiene-styrene latex | parts [1] 191 |
| Rhoplex A.C.33 | do 57 |
| Polystyrene latex | do 62 |
| Pigments | do 113 |
| Water | parts by weight 500 |

[1] Parts are of solids by weight.

The mixture was suitably plasticized with butyl phthalylyl butyl glycolate containing a small amount of tributoxy ethyl phosphate.

The wetting agents emulsifying agents, stabilizers and antiseptics already referred to in Example I are helpful and may be added. The emulsion is made up as in Example I.

Sheets of reclaim rubber or other rubber containing sulfur can be coated with the material, dried, and treated with a mold release, namely polyethylene glycol. The sheets can be cured by heating in a mold to vulcanize the rubber of the base sheet and simultaneously to cure the film. If the mold is provided with a rugose pattern on a surface, the pattern will be faithfully reproduced (in negative) and the film will uniformly follow all features. The cured films adhere tenaciously and are strongly mar resistant.

The techniques of the present invention are especially applicable to the coating of mats having textured surfaces because of the remarkable fidelity and uniformity with which the coating film follows the surface of the rubber during the molding operation. However, it will be appreciated that the same emulsion material may also be employed to coat sheets of rubber which are subsequently molded in molds having smooth surfaces so that a smooth sheet is obtained. Coherence between the coating film and the rubber base will be good and the film will have a high degree of toughness and wear, or abrasion resistance. It will be appreciated that the techniques of the invention may also be applied to various articles other than mats for purposes of providing decorative and/or protective films thereupon. The rubber base can, if desired, be formed of a stock which in addition to the rubber and filler ingredients may include blowing agents, such as ammonium carbonate, or other agents designed to release gases when heated in order to form a cellulated rubber structure.

While the emulsion coatings are exceptionally meritorious in coating sheets which are to be molded with the coating in contact with a mold surface, they are, however, also useful for coating surfaces which are not subsequently molded. The emulsions may be sprayed upon, or otherwise applied to an article composed of rubber and the article may be cured with the coated surface free. Naturally, it is not feasible to impart a predetermined rugose pattern to such surface.

It will be appreciated by those skilled in the art that numerous modifications may be made in the embodiments of the invention herein disclosed without departure from the spirit of the invention or the scope of the appended claims.

We claim:

1. A method of forming a rubber article having a rugose, textured surface which comprises applying to a plain blank sheet of compounded, vulcanizable rubber a coating of a pigmented aqueous emulsion of a vulcanizable synthetic latex and a polyvinyl resin, drying the emulsion and curing the sheet with the coated surface in contact with a heated mold surface textured to correspond to the surface desired in the article and concurrently curing the sheet and the film, thus providing an article comprising a rubber base with a rugosely textured surface having a wear resistant surface film of substantially uniform thickness adherent thereto.

2. A method of forming a rubber floor mat having a continuously coated, rugosely textured surface with a continuous film of substantially uniform thickness adherent thereto which comprises coating a surface of a plain sheet of uncured reclaim rubber stock containing vulcanizing ingredients, with a pigmented aqueous emulsion of a synthetic polymeric latex and a pulverulent vinyl resin pigmented to give desired color and being free of sulfur, drying the coating, inserting the coated article in a mold having a textured surface with the coated surface of the sheet in contact with said textured surface, heating the mold to cure the rubber sheet and concurrently to cure the coating by migration of sulfur from the sheet and stripping out the resultant mat from the mold.

3. A method of forming a rubber mat having a rugosely textured surface with a continuous, wear-resistant film of uniform thickness thereupon, which comprises forming a sheet of rubber stock comprising reclaim rubber, sulfur, vulcanization accelerators and filler material, applying to a surface of the sheet a film of a pigmented aqueous suspension of a synthetic latex, polystyrene, and finely pulverulent vinyl resin, drying the film, inserting the sheet in a mold having a suitably textured surface in contact with the coated surface of the sheet, heating the mold to cure the rubber sheet the coating being concurrently cured by migration of sulfur from the sheet and stripping out the resultant mat from the mold.

4. The method of claim 3 in which the emulsion is of butadiene-styrene interpolymer and polystyrene.

5. The method of claim 3 in which the pulverulent vinyl resin is a polyvinyl chloride-polyvinyl acetate interpolymer.

References Cited in the file of this patent

UNITED STATES PATENTS

| | | |
|---|---|---|
| 1,493,511 | Wing | May 13, 1924 |
| 1,967,863 | Collins | July 24, 1934 |
| 2,035,819 | Madge et al. | Mar. 31, 1936 |
| 2,161,024 | Doolittle | June 6, 1939 |
| 2,330,353 | Henderson | Sept. 28, 1943 |
| 2,437,855 | Leach | Mar. 16, 1948 |
| 2,512,726 | Penn et al. | June 27, 1950 |
| 2,626,886 | Scholl | Jan. 27, 1953 |
| 2,653,111 | Murray | Sept. 22, 1953 |
| 2,711,400 | Harrison et al. | June 21, 1955 |

UNITED STATES PATENT OFFICE
CERTIFICATION OF CORRECTION

Patent No. 2,922,195                          January 26, 1960

Paul Ludy et al.

It is hereby certified that error appears in the above numbered patent requiring correction and that the said Letters Patent should read as corrected below.

Column 1, line 48, for "regosely" read -- rugosely --; column 4, line 66, after "of" insert -- the --; column 5, line 49, for "surfur" read -- sulfur --.

Signed and sealed this 9th day of May 1961.

(SEAL)
Attest:

ERNEST W. SWIDER                                    DAVID L. LADD
Attesting Officer                                       Commissioner of Patents